(12) United States Patent
Choi et al.

(10) Patent No.: US 10,696,234 B2
(45) Date of Patent: Jun. 30, 2020

(54) COVERING SHELF APPARATUS FOR VEHICLES

(71) Applicants: Hyundai Motor Company, Seoul (KR); Kia Motors Corporation, Seoul (KR)

(72) Inventors: Ja Hae Choi, Jeollabuk-do (KR); Jae Eun Chang, Gyeonggi-Do (KR); Jun Pyo Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 158 days.

(21) Appl. No.: 15/977,288

(22) Filed: May 11, 2018

(65) Prior Publication Data

US 2019/0161016 A1 May 30, 2019

(30) Foreign Application Priority Data

Nov. 30, 2017 (KR) .................. 10-2017-0163747

(51) Int. Cl.
*B60R 5/04* (2006.01)
*B60R 7/08* (2006.01)

(52) U.S. Cl.
CPC .............. *B60R 5/044* (2013.01); *B60R 5/045* (2013.01); *B60R 7/08* (2013.01)

(58) Field of Classification Search
CPC ............ B60R 5/044; B60R 5/045; B60R 7/08
USPC ........................................... 296/24.43, 24.44
See application file for complete search history.

(56) References Cited

U.S. PATENT DOCUMENTS 9,511,801 B2 * 12/2016 Murray .................. B62D 25/20

FOREIGN PATENT DOCUMENTS

| DE | 102009041233 A1 | * | 4/2010 | .............. B60R 5/045 |
|----|-----------------|---|--------|---------------|
| EP | 2008871 A1 | * | 12/2008 | .............. B60R 5/04 |
| EP | 2048031 A1 | * | 4/2009 | .............. B60R 5/04 |
| JP | 58022735 A | * | 2/1983 | .............. B60R 5/045 |
| JP | 2009196482 A | * | 9/2009 | .............. B60R 5/045 |
| KR | 10-1551072 B1 | | 9/2015 | |

OTHER PUBLICATIONS

English translation of JP 2009-196482; retreived via PatentTranslate located at www.epo.org. (Year: 2019).*
English translation of JP 58-022735; retreived via PatentTranslate located at www.epo.org. (Year: 2019).*

* cited by examiner

*Primary Examiner* — Jason S Daniels
(74) *Attorney, Agent, or Firm* — Mintz Levin Cohn Ferris Glovsky and Popeo, P.C.; Peter F. Corless

(57) ABSTRACT

A covering shelf apparatus for a vehicle is provided. The apparatus is convertible into a using state in which the covering shelf operating separately from a tailgate closes a luggage compartment, a standing state in which the covering shelf is open at an angle, and a stowed state in which the covering shelf is inserted behind a rear seat. Accordingly, freight is capable of being loaded on the covering shelf in the using state in which the covering shelf closes the luggage compartment. Since the covering shelf is operated separately from the tailgate, the covering shelf is capable of being used more conveniently.

10 Claims, 21 Drawing Sheets

COVERING SHELF APPARATUS FOR VEHICLES

CROSS REFERENCE TO RELATED APPLICATION

The present application claims priority to Korean Patent Application No. 10-2017-0163747, filed Nov. 30, 2017, the entire contents of which is incorporated herein for all purposes by this reference.

BACKGROUND

Field of the Invention

The present invention relates to a covering shelf apparatus for a vehicle and, more particularly, to a covering shelf apparatus for a vehicle that is convertible into a using state that covers a luggage compartment, a standing state in which it is open at an angle, and a stowed state in which it is inserted behind a rear seat.

Description of the Related Art

Generally, hatchback vehicles (e.g., SUVs, CUVs, etc.) provide a space between a rear seat and a tailgate as a luggage compartment and these vehicles are equipped with a covering shelf disposed between the rear seat and the tailgate to separate the interior for passengers and the space provided as a luggage compartment. The covering shelf is generally connected to the tailgate of a vehicle through a pair of wires (cables) to be opened and closed with the opening and closing of the tail gate, and for example, the front end of the covering shelf is hinged to a luggage side trim and the rear end of the covering shelf is connected to the tail gate through wires.

According to this structure, when the tailgate is opened, the rear end is lifted up to be opened about the hinged point at the front end of the covering shelf, but the covering shelf remains in the space of the luggage compartment when freight is loaded and unloaded into and out of the luggage compartment, thus causing the covering shelf to interfere with this work of loading and unloading freight, and particularly, the user's head may be injured by hitting against the covering shelf. Further, according to this structure, when the tailgate is rapidly opened and closed, the hinged point at the front end of the covering shelf may be separated from the luggage side trim, which causes unnecessary work for reassembling the covering shelf.

The description provided above as a related art of the present invention is just for helping understanding the background of the present invention and should not be construed as being included in the related art known by those skilled in the art.

SUMMARY

An object of the present invention is to provide a covering shelf apparatus for a vehicle, the apparatus being separately operated regardless of a tailgate and being convertible into a using state that covers a luggage compartment, a standing state in which it is open at an angle, and a stowed state in which it is inserted behind a rear seat, thereby being able to improve convenience in loading and unloading freight into and out of a luggage compartment and to maximally use the space of the luggage compartment since freight is capable of being loaded on two floors over and under the covering shelf with the luggage compartment closed.

According to an aspect of the present invention, a covering shelf apparatus for a vehicle may include: a covering shelf having front protrusive hinges and rear protrusion hinges on left and right sides of each of a front portion and a rear portion thereof; and luggage side trims each having a front guide rail and a rear guide groove in which the front hinges and the rear hinges are respectively inserted, in which as the front hinges and the rear hinges are moved in the front guide rails and the rear guide groove, the covering shelf may be converted into a using state in which it is positioned over a luggage compartment to cover the luggage compartment, a standing state in which it is open at an angle, and a stowed state in which it is inserted behind a rear seat.

Additionally, a plurality of supports that extend in a front-rear direction, protrude in a left-right direction, and are disposed under the rear guide groove may be formed on the luggage side trims, and when the covering shelf is in the using state in which it is positioned over the luggage compartment to cover the luggage compartment, a bottom of the covering shelf may be supported by the supports. A fixing projection may protrude upward from each of the supports and projection grooves in which the fixing projections are inserted may be formed on the covering shelf to restrict movement of the covering shelf in the using state.

The rear guide grooves may be positioned over rear portions of the supports and may be open upward, and each rear guide groove may have an inclined surface that extends downward from the open top and a vertical surface that connects the inclined surface and the open top. The inclined surface may be positioned ahead of the vertical surface. The front guide rails may extend longitudinally at an angle with lower ends positioned forward further than upper ends, and the upper ends may be open upward.

The front guide rails each may have: an upper slot open upward; a lower slot formed at a predetermined distance from the upper slot and extending downward in a longitudinal direction of the upper slot at the same angle; a transverse slot that extends rearward from a lower end of the upper slot; and a connecting slot that extends forward from a rear end of the transverse slot and connected to the lower slot. A fixing slot may be connected to the lower end of each of the upper slots, and the rear hinges (e.g., not the front hinges) of the covering shelf may be inserted into the fixing slots.

The front hinges of the covering shelf may have a cross-sectional diameter unable to be inserted into the fixing slots (e.g., the cross-sectional diameter thereof is too large to fit into the slots) and the cross-sectional diameter may be greater than that of the rear hinges. The rear hinges of the covering shelf may have a cross-sectional diameter capable of being inserted into the fixing slots (e.g., the cross-sectional diameter thereof is of a size which fits into the slots) and the cross-sectional diameter may be less than the cross-sectional diameter of the front hinges. When the front hinges are positioned at the lower ends of the upper slots and the rear hinges may be inserted in the rear guide grooves, the covering shelf may be positioned over the luggage compartment with the bottom supported by the supports, and thus, the using state in which the covering shelf closes the luggage compartment may be maintained.

Locking projections that extend vertically at the same angle as the lower slots and positioned at sides of the lower slots may be formed on the luggage side trims. When the bottom of the covering shelf is in contact with both of front ends of the supports and upper ends of the locking projections, the covering shelf may be maintained in the standing state in which it is open at an angle. When the front hinges are positioned at lower ends of the lower slots and the rear hinges are inserted in the fixing slots, the covering shelf may be in the stowed state in which it is inserted behind the rear seat with the same angle as the front guide rails maintained.

According to the covering shelf apparatus of the present invention, since the covering shelf according to the present invention may be operated separately from the tailgate, the covering shelf may be used more conveniently. Further, since the covering shelf of the present invention is convertible into a using state in which it closes the luggage compartment, a standing state in which it is open at an angle, and a stowed state in which it is inserted behind the rear seat, it may be possible to more conveniently load and unload freight into and out of the luggage compartment. Additionally, since it may be possible to load freight into the luggage compartment, which is the space under the covering shelf, and also load freight onto the covering shelf when the covering shelf is in the using state in which it closes the luggage compartment, that is, since it may be possible to load freight on two floors, the space of the luggage compartment may be maximally used.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A covering shelf apparatus for a vehicle according to exemplary embodiments of the present invention is described hereafter in detail with reference to the accompanying drawings.

Figure 15:
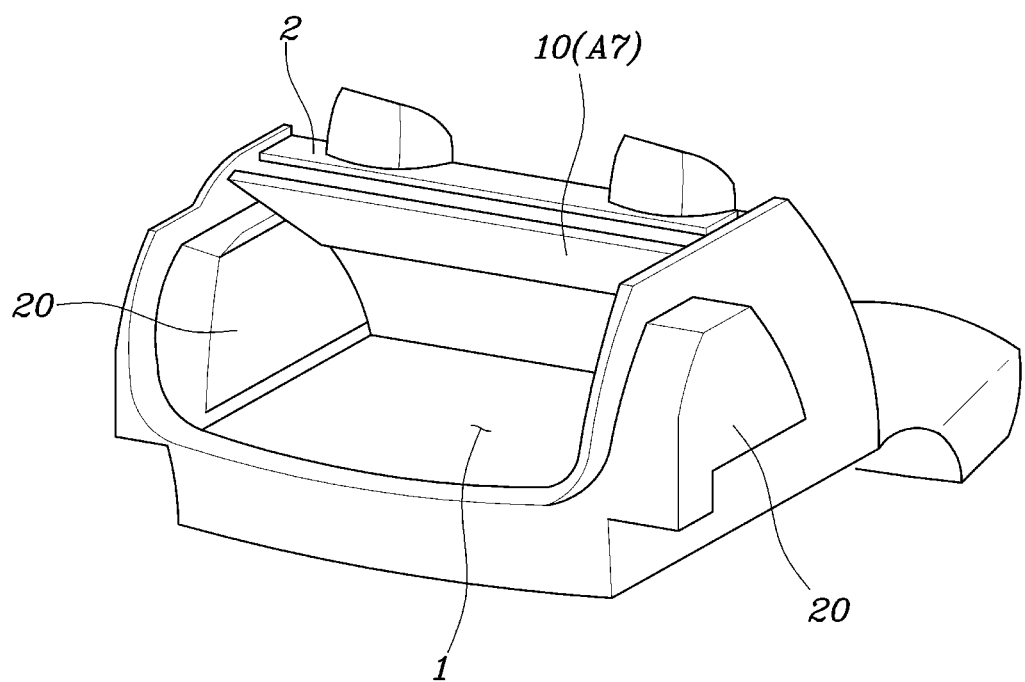
FIGS. 15 and 16 are respectively a perspective view and a side view when the covering shelf according to an exemplary embodiment of the present invention is in the standing state.
Figure 16:
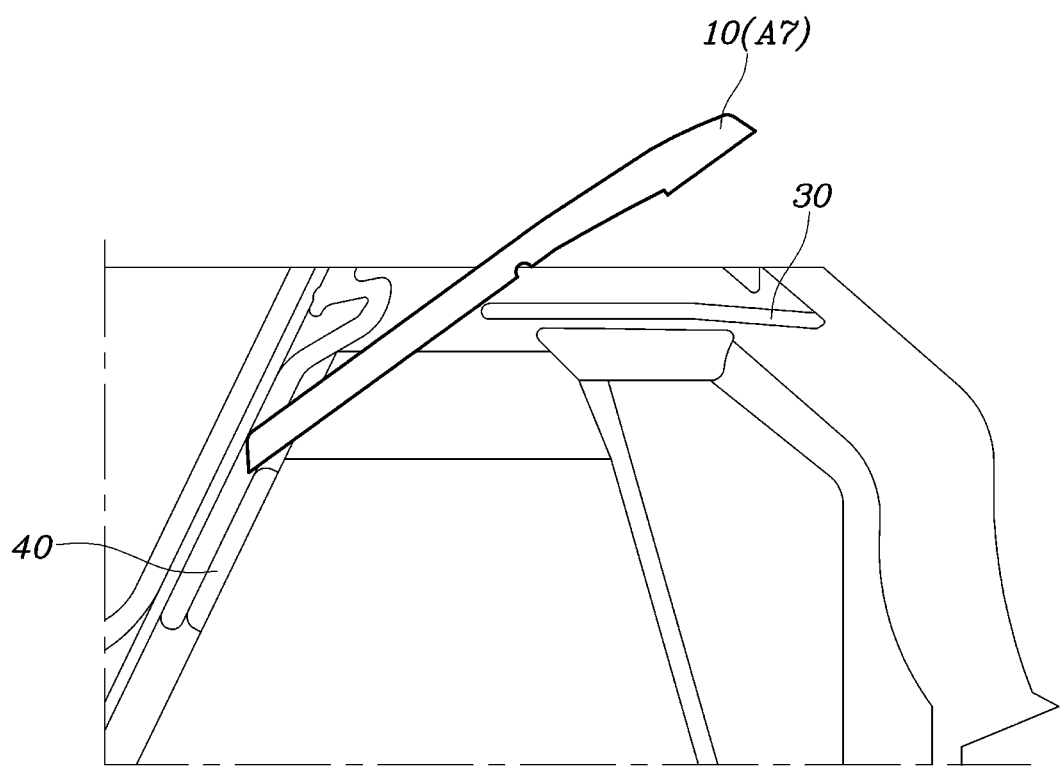
Figure 19:
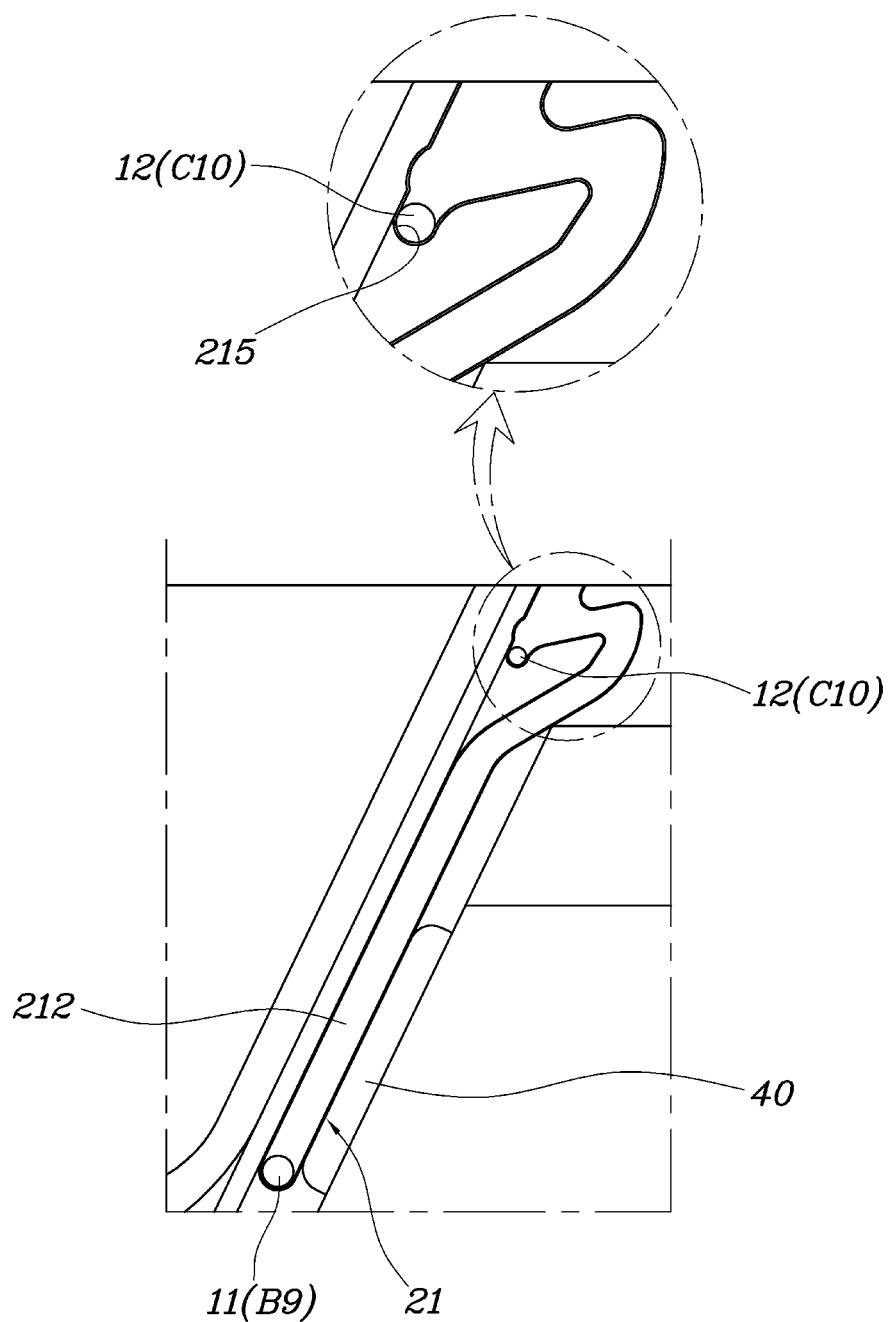
FIG. 19 is a view showing the positions of the front hinge and the rear hinge when the covering shelf is in the stowed state according to an exemplary embodiment of the present invention.
Figure 20:
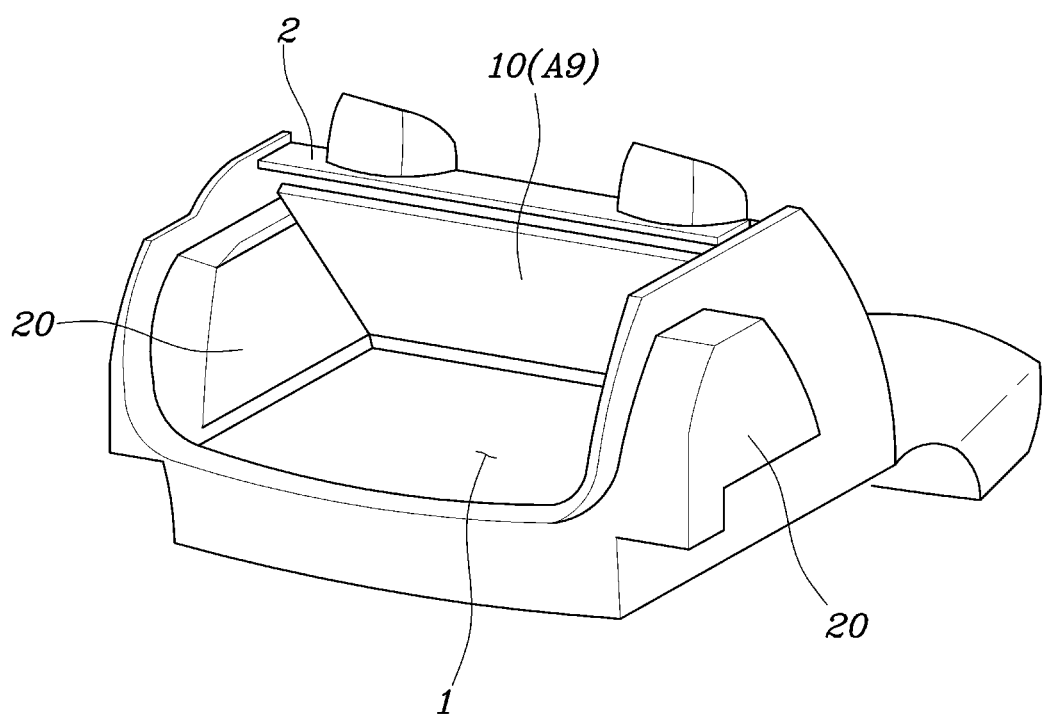
FIGS. 20 and 21 are respectively a perspective view and a side view when the covering shelf according to an exemplary embodiment of the present invention is in the stowed state.
Figure 21:
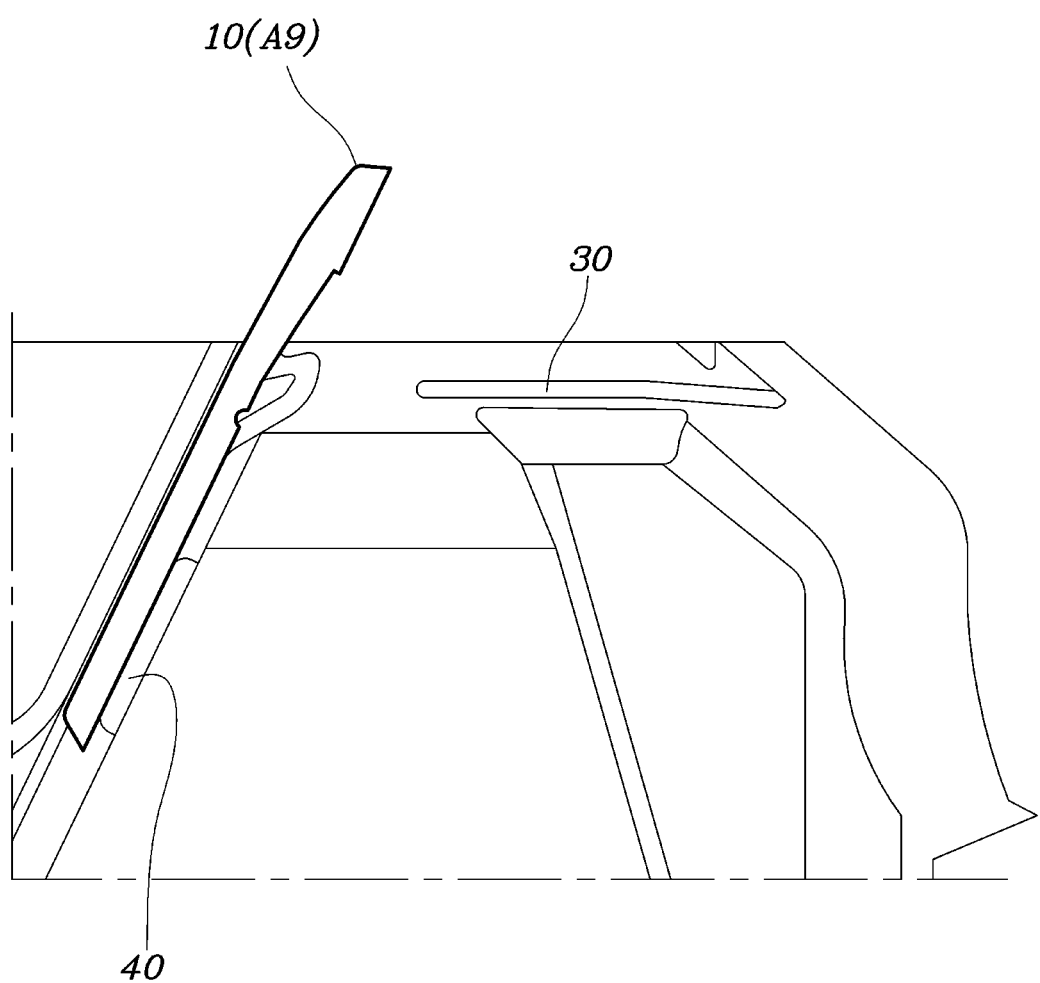

A covering shelf apparatus for a vehicle according to the present invention, as shown in FIGS. 1 to 21, may include: a covering shelf 10 having front protrusive hinges 11 and rear protrusion hinges 12 on left and right sides of each of the front portion and the rear portion; and luggage side trims 20 each having a front guide rail 21 and a rear guide groove 22 in which the front hinges 11 and the rear hinges 12 are respectively inserted, in which as the front hinges 11 and the rear hinges 12 are moved in the front guide rails 21 and the rear guide groove 22, the covering shelf 10 may be converted into a using state in which it is positioned over a luggage compartment 1 to cover the luggage compartment 1 (state shown in FIGS. 1 and 2), a standing state in which it is open at an angle (state shown in FIGS. 15 and 16), and a stowed state in which it is inserted behind a rear seat 2 (state shown in FIGS. 20 and 21).

Further, according to an exemplary embodiment of the present invention, supports 30 that extend in the front-rear direction (e.g., extend from a front to a rear), protrude in the left-right direction, and are disposed under the rear guide groove 22 may be formed on the luggage side trims 20, and thus, when the covering shelf 10 is in the using state in which it is positioned over the luggage compartment 1 to cover the luggage compartment 1, the bottom of the covering shelf 10 may be supported by the supports 30.

A fixing projection 31 may protrude upward from the supports 30 and projection grooves 13 in which the fixing projections 31 are inserted may be formed on the covering shelf 10, and thus, when the covering shelf 10 is in the using state in which it is positioned over the luggage compartment 1 to cover the luggage compartment 1, the covering shelf 10 may be locked in front-rear movement by the fixing projections 31 inserted in the projection grooves 13. The rear guide grooves 22 may be positioned over the rear portions of the supports 30 and may be open upward and each may have an inclined surface 22a that extends downward from the open top and a vertical surface 22b that connects the inclined surface 22a and the open top, in which the inclined surface 22a is positioned ahead of the vertical surface 22b.

The inclined surfaces may guide the rear hinges 12 to smoothly insert the rear hinges 12 into the rear guide grooves 22 and the vertical surfaces 22b may prevent the rear hinges 12 inserted in the rear guide grooves 22 from moving further rearward (e.g., the movement may be restricted), thereby preventing unexpected separation of the covering shelf 10. The front guide rails 21 may extend longitudinally at an angle with the lower ends positioned forward further than the upper ends, and the upper ends may be open upward. In particular, the front guide rails 21 may each include: an upper slot 211 open upward; a lower slot 212 formed at a predetermined distance from the upper slot 211 and extending downward in the longitudinal direction of the upper slot 211 at the same angle; a transverse slot 213 that extends rearward from the lower end of the upper slot 211; and a connecting slot 214 that extends forward from the rear end of the transverse slot 213 and connected to the lower slot 212.

Further, the front guide rails 21 may each further include a fixing slot 215 connected to the lower end of the upper slot 211, and the rear hinges 12 (e.g., not the front hinges 11) of the covering shelf 10 may be inserted into the fixing slots 215. In other words, the front hinges 11 of the covering shelf 10 may have a cross-sectional diameter D1 unable to be inserted into the fixing slots 215 (e.g., the front hinges are greater in cross-sectional diameter than the fixing slots) and the cross-sectional diameter may be greater than the cross-sectional diameter of the rear hinges 12. Further, the rear hinges 12 of the covering shelf 10 may have a cross-sectional diameter D2 capable of being inserted into the fixing slots 215 (e.g., the rear hinges are smaller in cross-sectional diameter than the fixing slots) and the cross-sectional diameter may be less than the cross-sectional diameter of the front hinges 11.

The cross-sectional diameter of the front hinges 11 is D1 and the cross-sectional diameter of the rear hinges 12 is D2, in which D1 is greater than D2, D1 is greater than the cross-sectional diameter of the fixing slots 215, and D2 is less than the cross-sectional diameter of the fixing slot 215. Accordingly, when the covering shelf 10 is in the stowed state in which it is inserted behind the rear seat 2 (the state shown in FIGS. 20 and 21), the rear hinges 12 of the covering shelf 10 may be inserted in the fixing slots 215, and thus, the vertical movement of the covering shelf 10 may be restricted.

Figure 1:
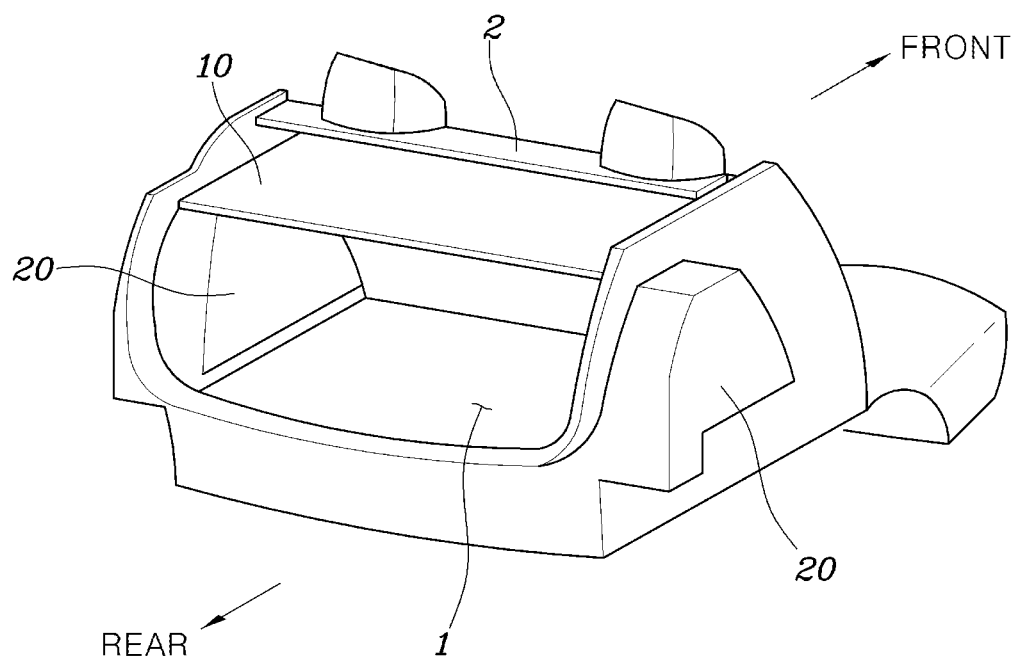
FIGS. 1 and 2 are respectively a perspective view and a side view showing a using state in which a luggage compartment is closed with a covering shelf according to an exemplary embodiment of the present invention positioned over the luggage compartment.
Figure 2:
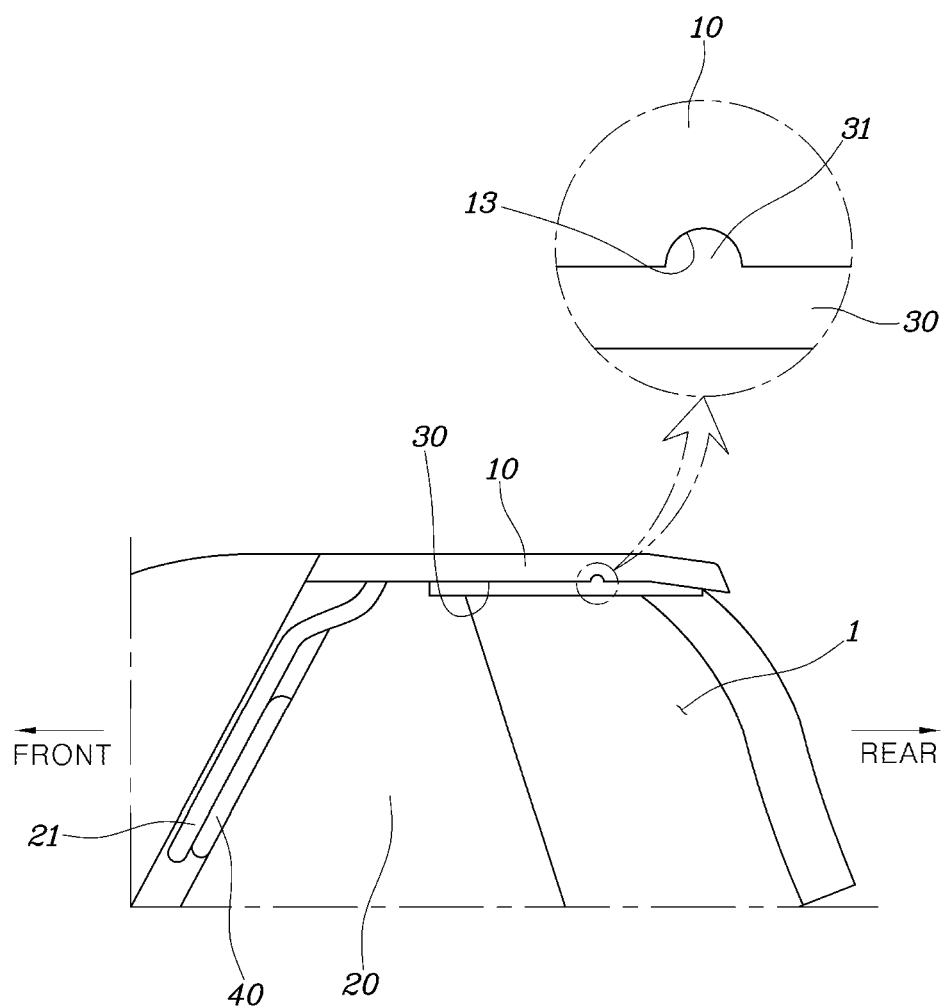
Figure 3:
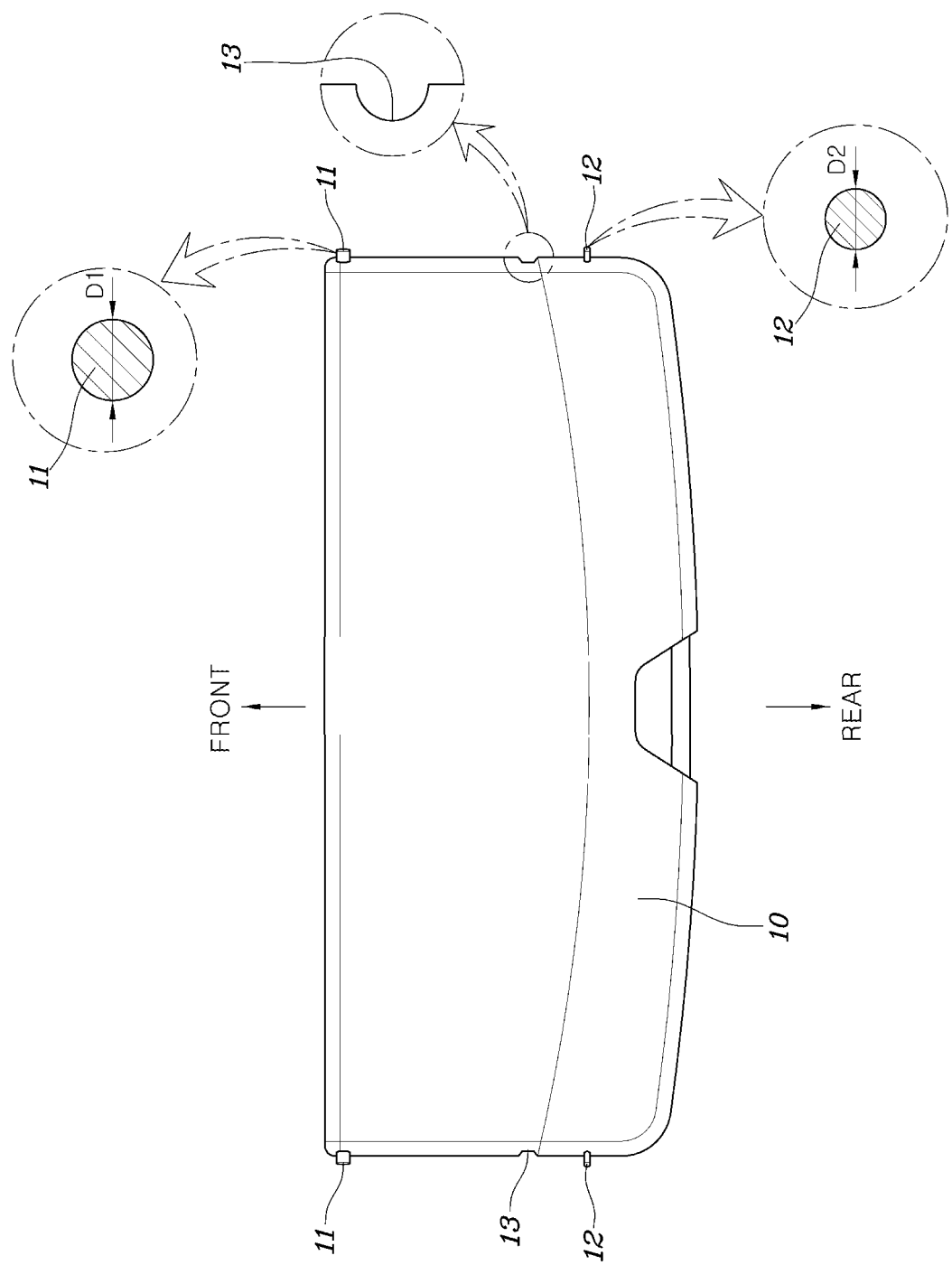
FIG. 3 is a plan view of a covering shelf with a front hinge and a rear hinge according to an exemplary embodiment of the present invention.
Figure 4:
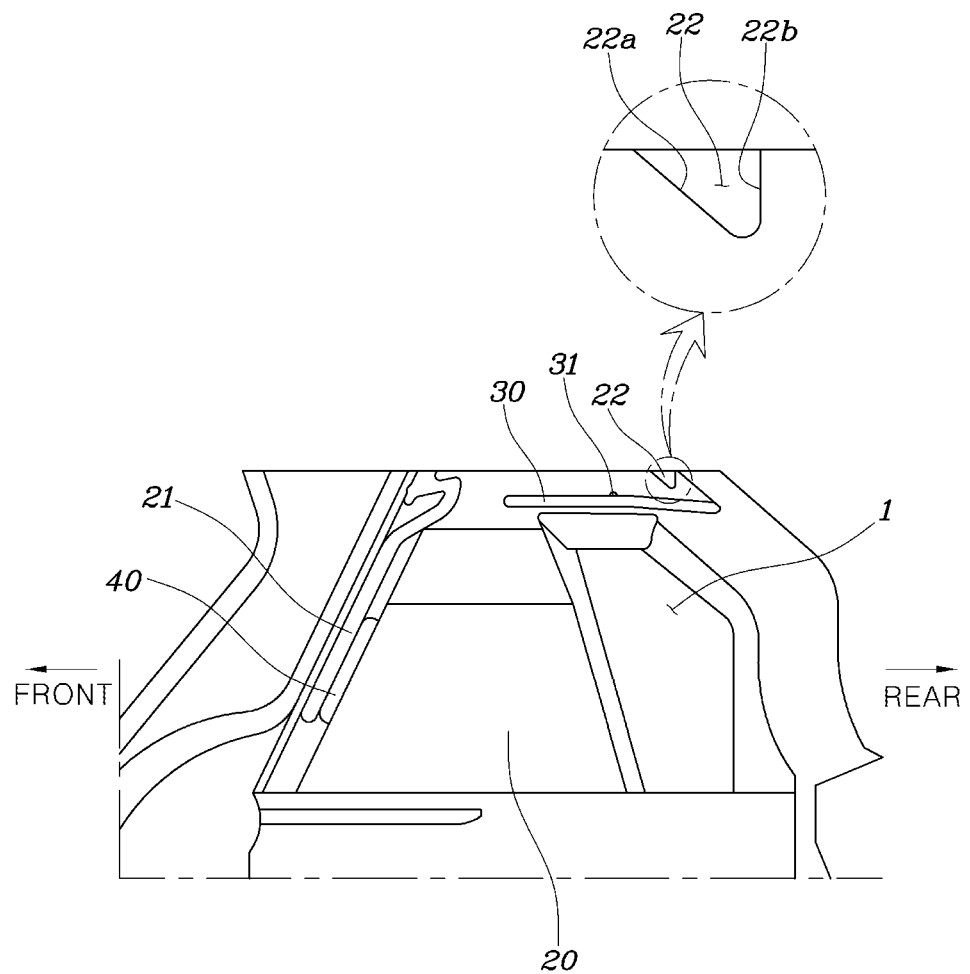
FIG. 4 is a side view showing a luggage side trim with a front guide rail and a rear guide rail according to an exemplary embodiment of the present invention.
Figure 5:
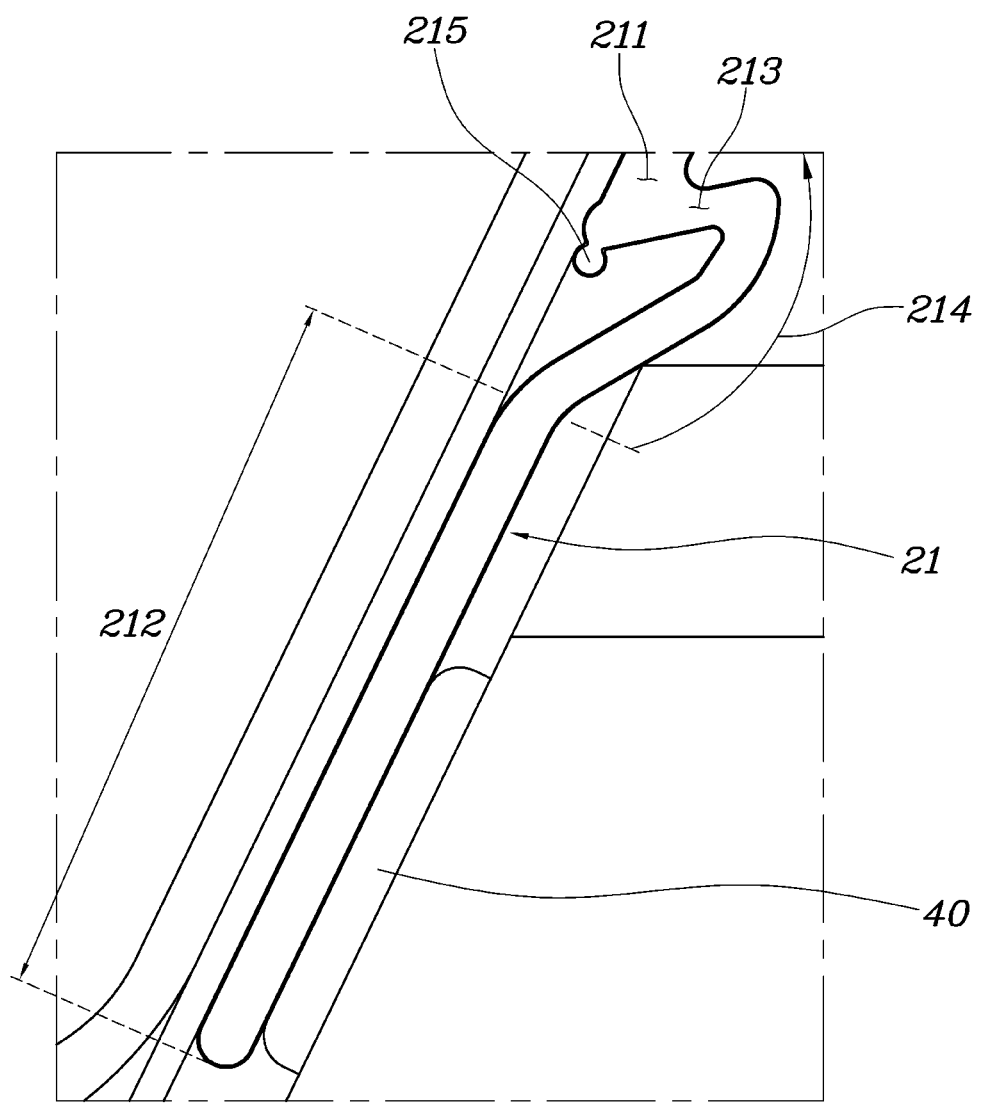
FIG. 5 is a detailed view of the front guide rail according to an exemplary embodiment of the present invention.

According to an exemplary embodiment of the present invention, when the front hinges 11 are positioned at the lower ends of the upper slots 211 and the rear hinges 12 are inserted in the rear guide grooves 22, the covering shelf 10 may be positioned over the luggage compartment 1 with the bottom supported by the supports 30, and thus, the using state in which the covering shelf closes the luggage compartment 1 may be maintained (state shown in FIGS. 1 and 2). Further, locking projections 40 that extend vertically at the same angle as the lower slots 212 and positioned at sides of the lower slots 212 may be formed on the luggage side trims, and thus, when the bottom of the covering shelf 10 is in contact with both of the front ends of the supports 30 and the upper ends of the locking projections 40, the covering shelf 10 may be maintained in the standing state in which it is open at an angle (state shown in FIGS. 15 and 16). Additionally, when the front hinges 11 are positioned at the lower ends of the lower slots 212 and the rear hinges 12 are inserted in the fixing slots 215, the covering shelf 10 may be maintained in the stowed state in which it is inserted behind the rear seat 2 with the same angle as the front guide rails 21 (state shown in FIGS. 20 and 21).

Figure 6:
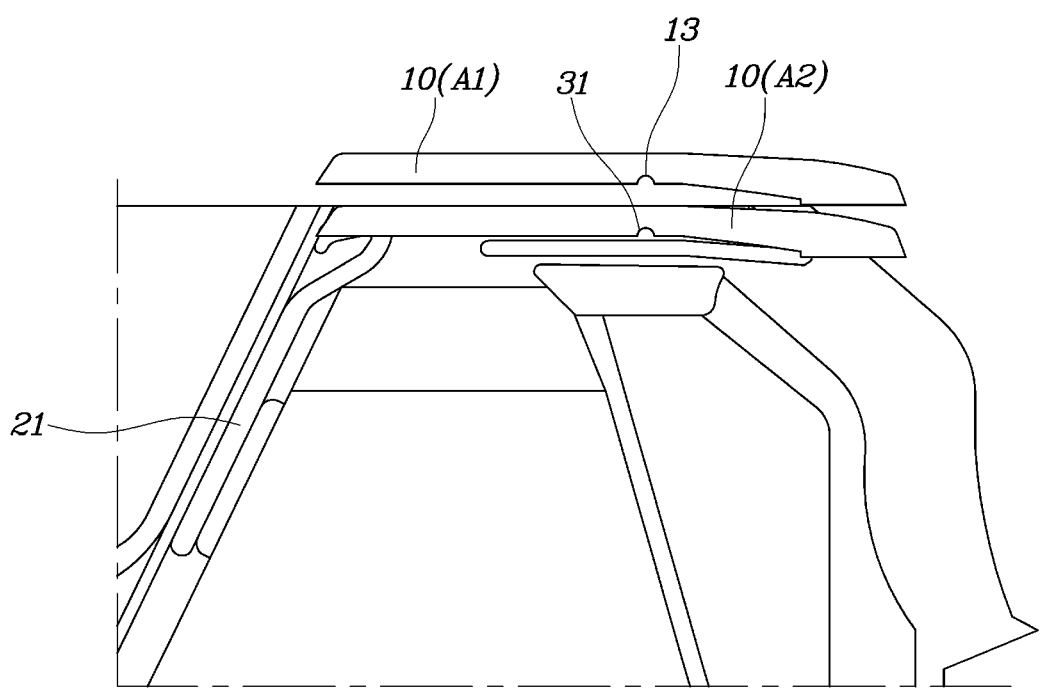
FIG. 6 is a view showing a process of mounting the covering shelf according to an exemplary embodiment of the present invention onto the luggage side trims.

The operation of an exemplary embodiment of the present invention is described hereafter. FIG. 6 is a view showing a process of mounting the covering shelf 10 according to the present invention onto the luggage side trims 20. In the state A1 of the covering shelf 10 in which the covering shelf 10 is not mounted yet on the side trims 20, the front hinges 11 and the rear hinges 12 may be positioned outside and over the front guide rails 21 and the rear guide rails 22, as in the states B1 and C1 in FIG. 7.

Figure 7:
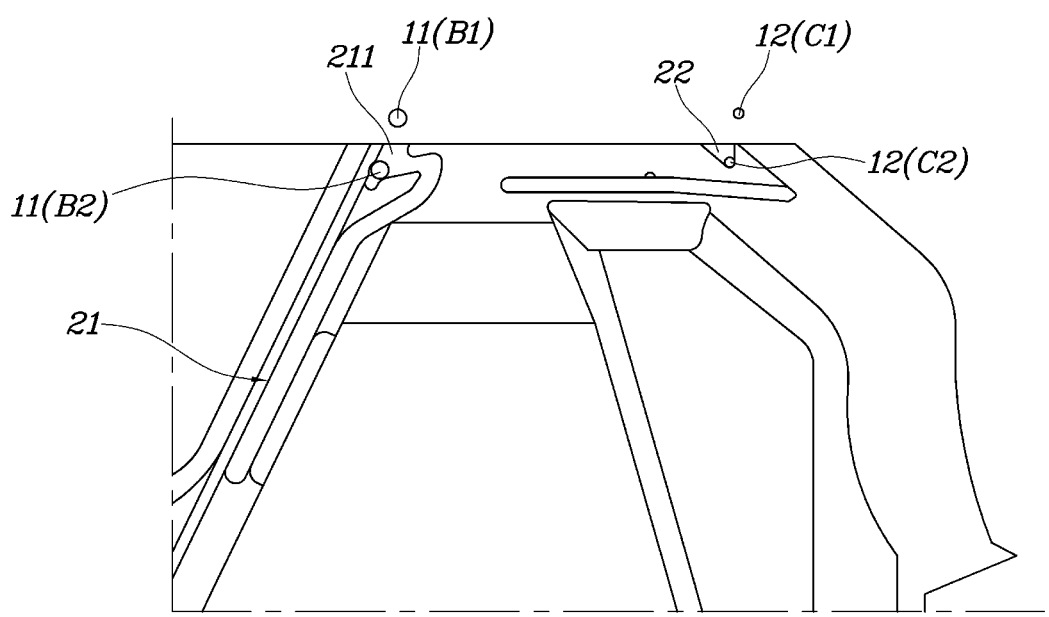
FIG. 7 is a view showing the positions of the front hinge and the rear hinge in the state shown in FIG. 6 according to an exemplary embodiment of the present invention.

In the state A2 of the covering shelf 10 in which the covering shelf 10 has been mounted on the luggage side trims 20, the front hinges 11 may be inserted in the front guide rails 21 and positioned at the lower ends of the upper slots 211, as in the state B2 in FIG. 7, and the rear ends 12 may be inserted in the rear guide grooves 22, as in the state C2 in FIG. 7. The state A of the covering shelf 10 shown in FIG. 6 is the using state in which the covering shelf 10 may be positioned over the luggage compartment 1 with the bottom supported by the supports 30, thereby closing the luggage compartment 1, which is the same as the state shown in FIGS. 1 and 2.

Figure 8:
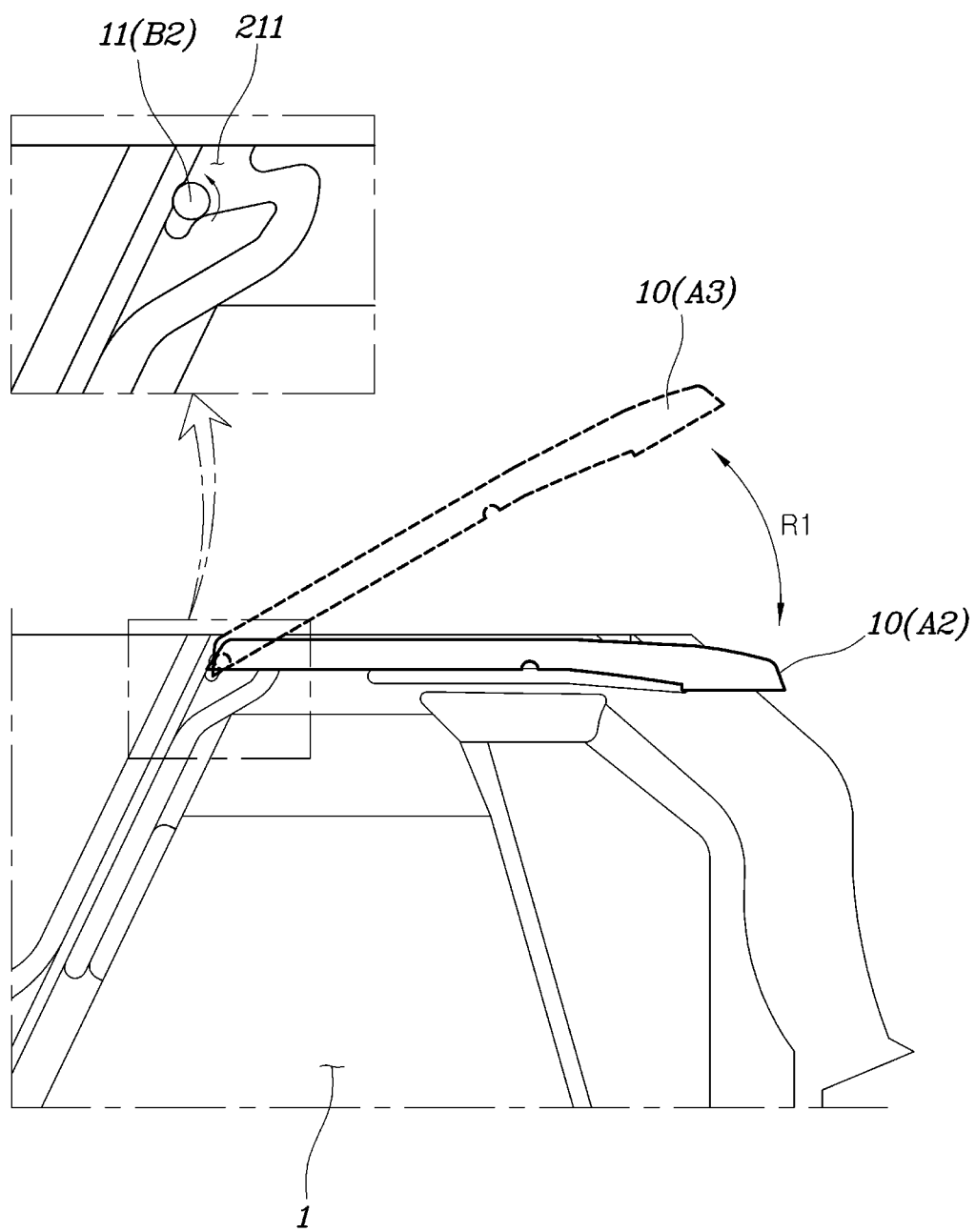
FIG. 8 is a view showing a state in which the rear end of the covering shelf has been swung up in the using state shown in FIG. 1 according to an exemplary embodiment of the present invention.

The state A2 in FIG. 8 shows the position of the covering shelf 10 in the using state and the state A3 is a state in which the rear end of the covering shelf 10 has been swung up (in the direction of an arrow R1) manually. When being rotated from the state A2 to the state A3, the covering shelf 10 may be rotated on the front hinges 11 inserted in the upper slots 211, and after rotating the covering shelf 10 into the state A3, the freight may be manually loaded or unloaded into and out of the luggage compartment 1.

Figure 9:
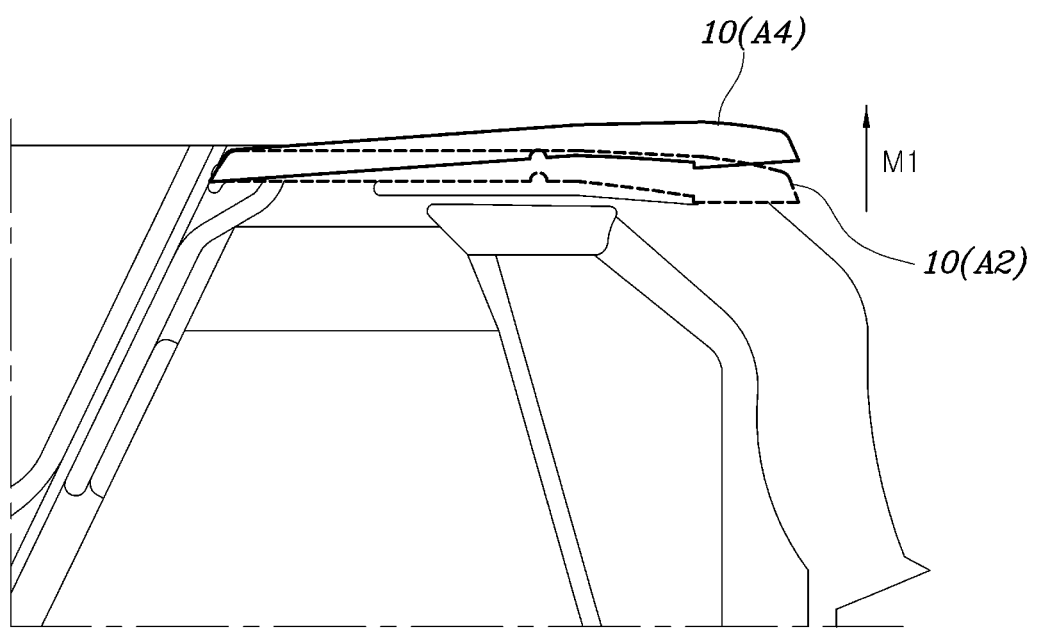
FIGS. 9 to 12 are views showing a process in which the covering shelf shown in FIG. 12 is moved into a standing state from the using state shown in FIG. 1 according to an exemplary embodiment of the present invention.
Figure 10:
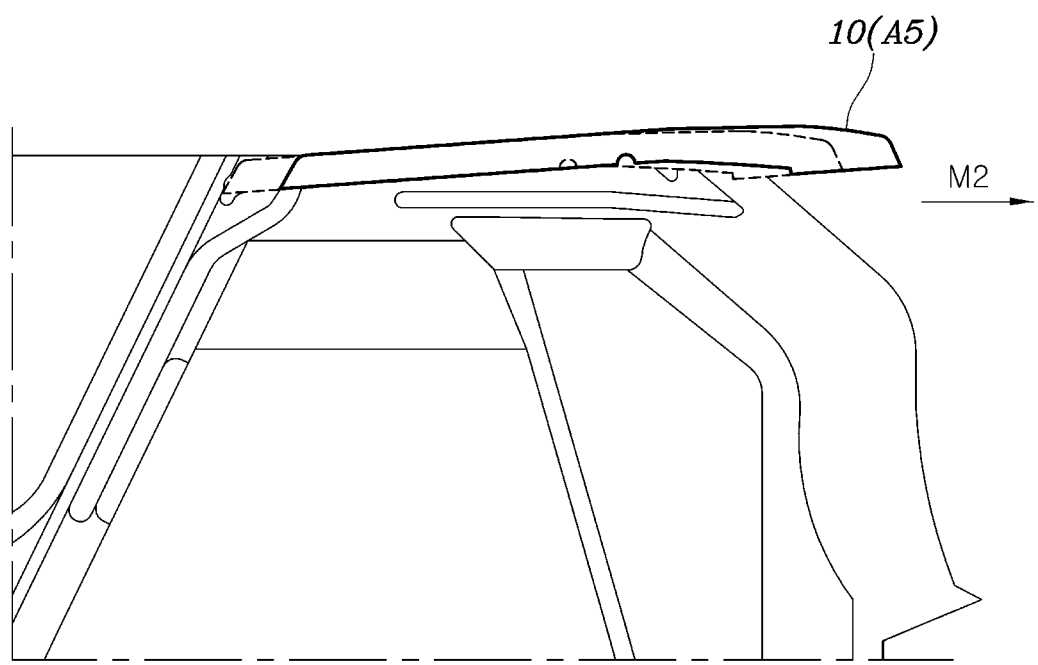
Figure 11:
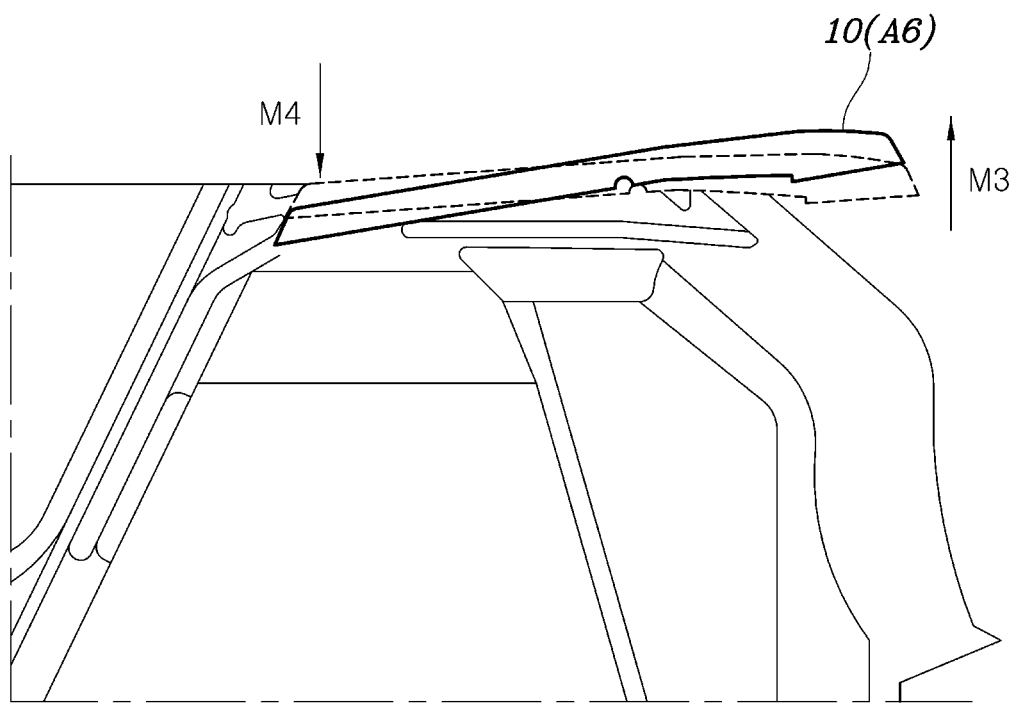
Figure 12:
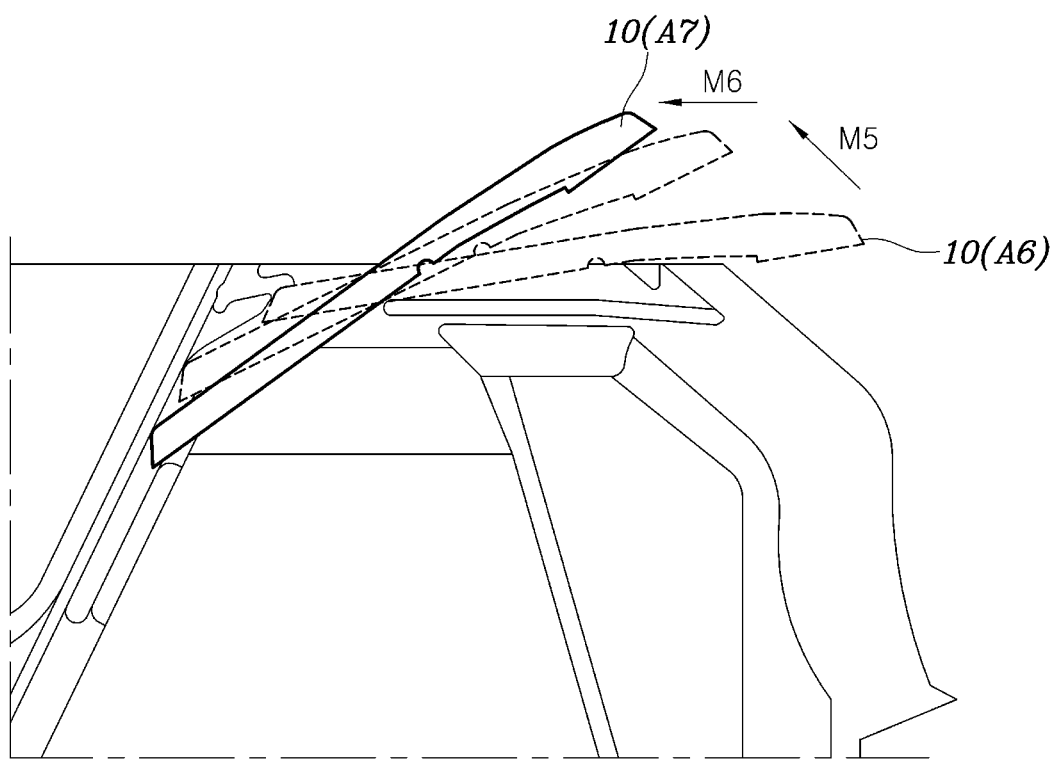
Figure 13:
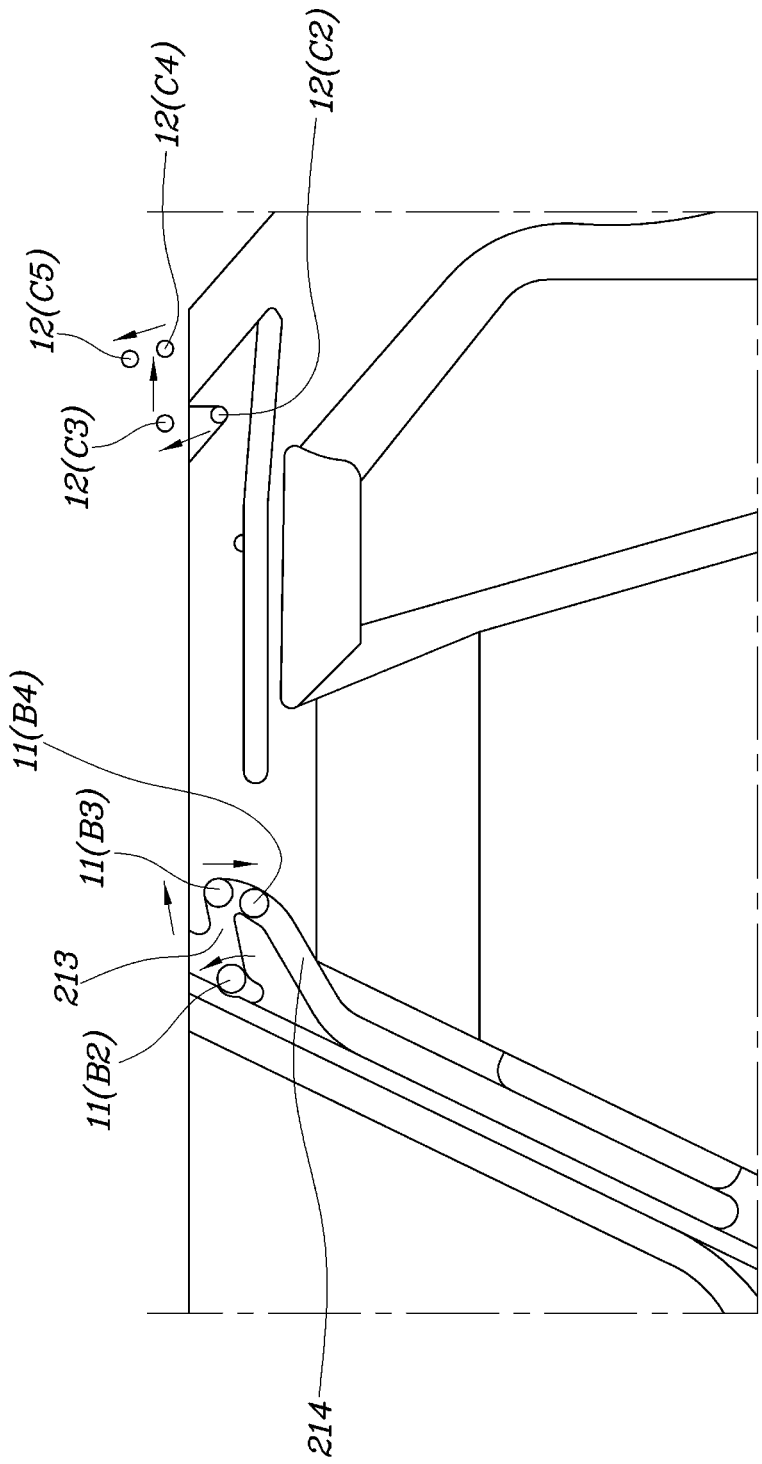
FIG. 13 is a view showing the positions of the front hinge and the rear hinge in the state shown in FIGS. 9 to 11 according to an exemplary embodiment of the present invention.
Figure 14:
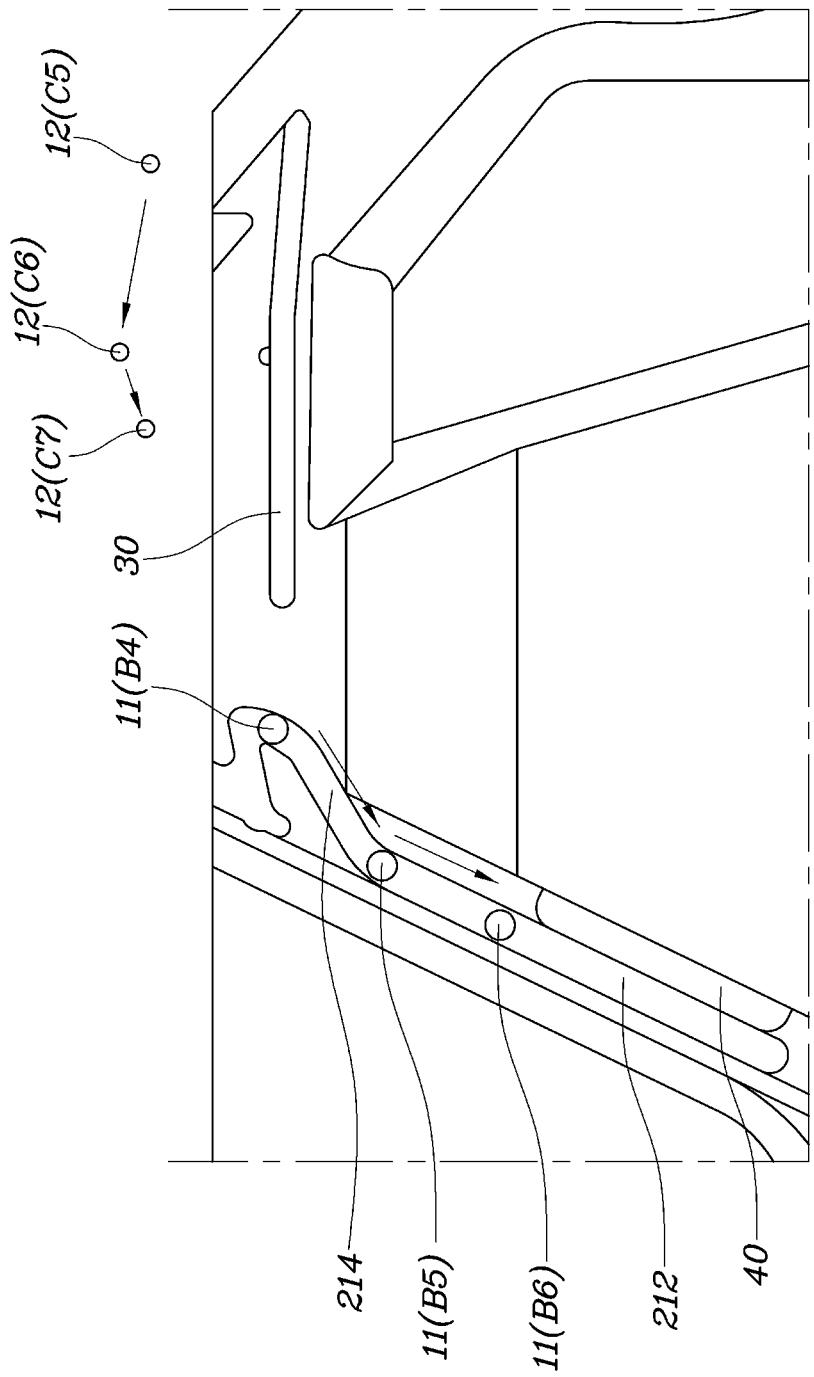
FIG. 14 is a view showing the positions of the front hinge and the rear hinge in the state shown in FIG. 12 according to an exemplary embodiment of the present invention.

FIGS. 9 to 12 are views showing a process in which the covering shelf 10 is moved into a standing state from the using state, FIG. 13 is a view showing the positions of the front hinges and the rear hinges in the state shown in FIGS. 9 to 11, and FIG. 14 is a view showing the positions of the front hinges and the rear hinges in the state shown in FIG. 12. In FIG. 9, the state A2 of the covering shelf 10 shows the position in the using state, in which the front hinges 11 and the rear hinges 12 are in the states B2 and C2 in FIG. 13.

When the rear end of the covering shelf 10 is lifted up (in the direction of an arrow M1) into the state A4 from the state A2 in FIG. 9, the rear hinges 12 may be moved vertically out of the rear guide grooves 22 into the state C3, as in FIG. 13. The state A5 in FIG. 10 shows a state in which the covering shelf 10 has been pulled rearward (in the direction of an arrow M2) from the state A4 in FIG. 9, in which the front hinges 11 are moved rearward along the transverse slots 213 into the state B3 and the rear hinges 12 are moved rearward into the state C4.

The state A6 in FIG. 11 shows a state in which the rear end of the covering shelf 10 is lifted up (in the direction of an arrow M3) from the state A5 in FIG. 10, in which the front end of the covering shelf 10 is moved down (in the direction of an arrow M4). In other words, when the rear end of the covering shelf 10 is lifted up from the state A5 in FIG. 10, the rear hinges 12 may be moved up vertically from the state C4 into the state C5 in FIG. 13 and the front hinges 11 in the transverse slots 213 may be moved down along the connecting slots 214 into the state B4, to move the front end of the covering shelf 10 downward (in the direction of the arrow M4).

Further, in the state A7 in FIG. 12, from the state S6, the rear end of the covering shelf 10 has been moved up and forward (in the direction of an arrow M5) and the covering shelf 10 has been moved downward (in the direction of an arrow M6) due to the weight of the covering shelf 10. When the rear end of the covering shelf 10 is moved upward and forward from the state A6, the rear hinges 12 may be moved into the state C6 from the state C5 in FIG. 14, and the front hinges 11 positioned at the upper ends of the connecting slots 214, as in the state B4, may be moved downward along the connecting slots 214 to the lower ends of the connecting slots 214, as in the state B5.

Further, when the front hinges 11 are positioned at the lower ends of the connecting slots 214, as in the state B5, the covering shelf 10 may begin to move be further downward (in the direction of an arrow M6) due to the weight of the covering shelf 10 itself and the front hinges 11 may be moved downward along the lower slots 212 from the lower ends of the connecting slots 214 in the state B6. When the covering shelf 10 is moved down into the state A7 due to the weight thereof from the state A6, the bottom of the covering shelf 10 may come in contact with both of the front ends of the supports 30 and the upper ends of the locking projections 40, and thus, the covering shelf 10 may be maintained in the standing state in which it is open at an angle, as in FIGS. 15 and 16.

Figure 17:
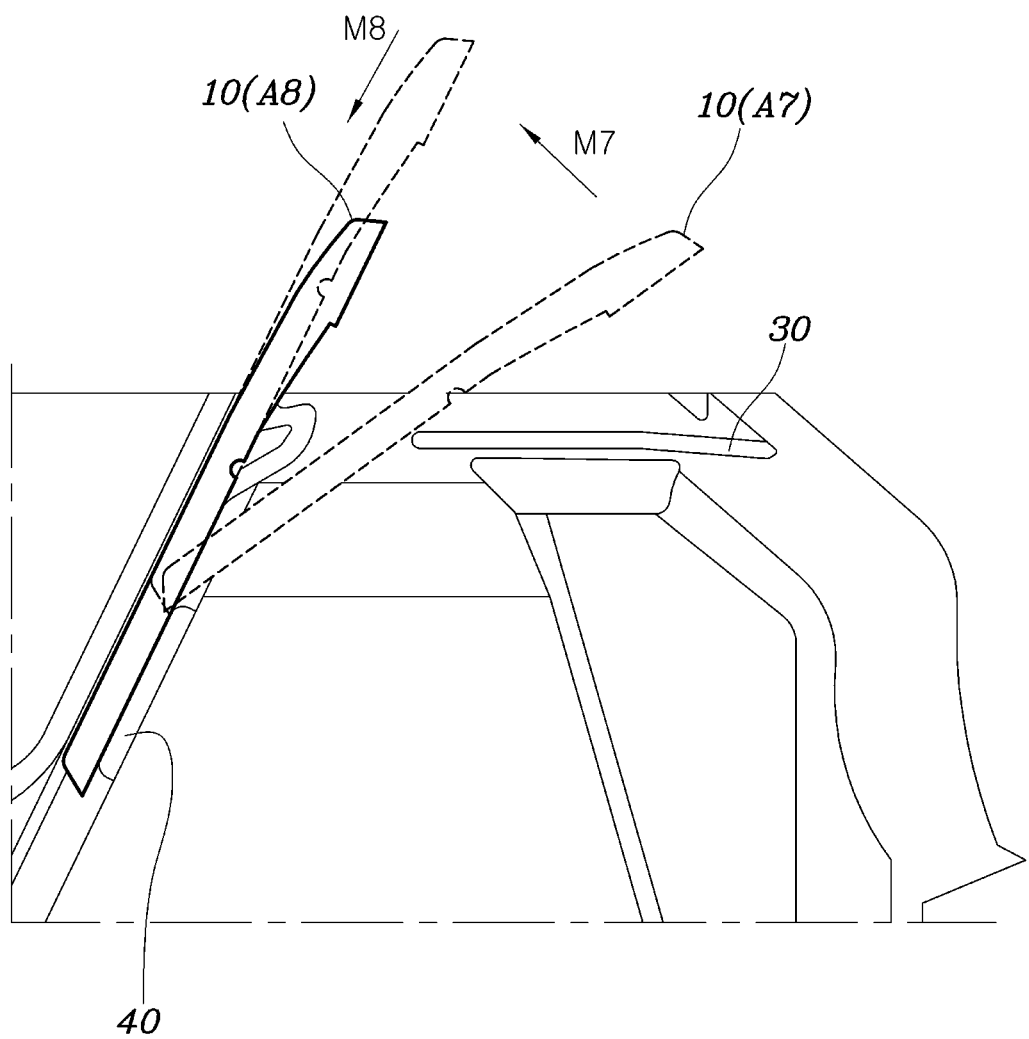
FIGS. 17 and 18 are respectively a view showing a process in which the covering shelf is moved into the stowed state from the standing state and a view showing the positions of the front hinge and the rear hinge according to an exemplary embodiment of the present invention.
Figure 18:
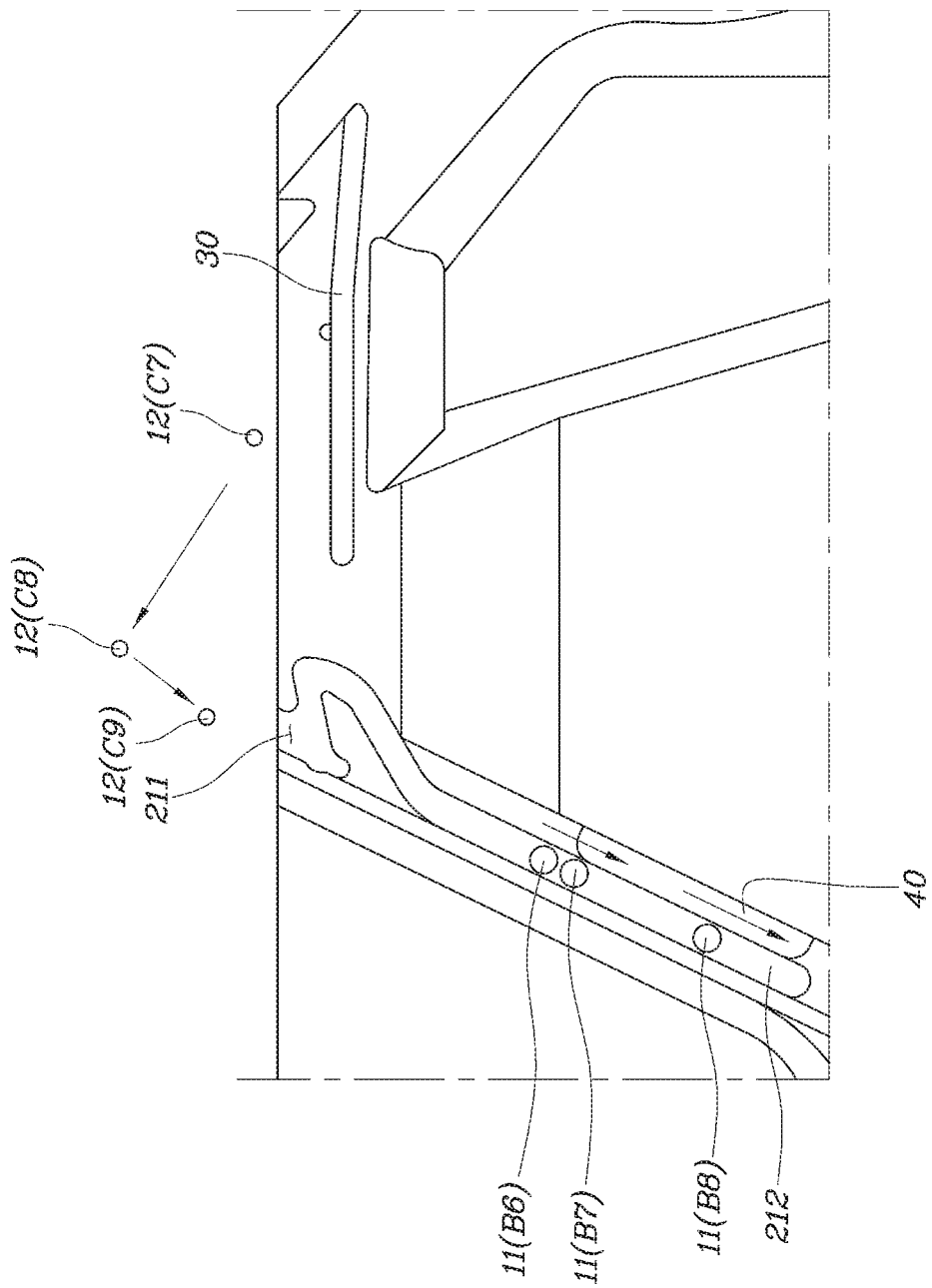

The state A8 in FIG. 17 is a state in which the rear end of the covering shelf 10 has been further lifted upward from the state A7, in which the front hinges 11 in the state B6 have been moved downward along the lower slots 212 into the state B7 and the rear hinges 12 have been moved upward and forward into the state C8 from the state C7, as in FIG. 18, in which the positions of the rear hinges 12 in the state C8 are on longitudinal extension lines of the upper slots 211. When the rear hinges 12 are moved in the state C8, as described above, the covering shelf 10 may be moved further downward (in the direction of an arrow M8) due to the weight thereof, in which the front hinges 11 may be moved further downward along the lower slots 213 into the B8 state and the rear hinges 12 may be moved forward and downward into the state C9 from the state C8.

With the front hinges 11 of the covering shelf 10 positioned in the state B8 and the rear hinges 12 positioned in the state C9, as in FIG. 18, when the covering shelf 10 is further moved down due to the weight thereof, as in FIG. 19, the front hinges 11 of the covering shelf 10 may be positioned at the lowermost ends of the lower slots 212 in the state B9 and the rear hinges 12 may be inserted in the fixing slots 215 in the state C10. Accordingly, the covering shelf 10 may be moved into the stowed state, as in the state C9, by being inserted behind the rear seat with the same angle as the front rail guides 21 maintained (state shown in FIGS. 20 and 21).

Moreover, the operation of returning the covering shelf 10 from the stowed state into the using state may be performed in the reverse sequence of the above description, so it is not described in detail. As described above, the covering shelf 10 according to the present invention may be operated separately from the tailgate, and thus, the covering shelf 10 may be used more conveniently.

Further, since the covering shelf 10 of the present invention is convertible into a using state in which the covering shelf 10 closes the luggage compartment 1, a standing state in which it is open at an angle, and a stowed state in which it is inserted behind the rear seat 2, it may be possible to more conveniently load and unload freight into and out of the luggage compartment 1. In addition, since it is possible to load freight into the luggage compartment 1, which is the space under the covering shelf 10, and also load freight onto the covering shelf 10 when the covering shelf 10 is in the using state in which it closes the luggage compartment 1, that is, since it is possible to load freight on two floors, the space of the luggage compartment 1 may be maximally used.

Although the present invention was described with reference to exemplary embodiments shown in the drawings, it is apparent to those skilled in the art that the present invention may be changed and modified in various ways without departing from the scope of the present invention, which is described in the following claims.

What is claimed is:

1. A covering shelf apparatus for a vehicle, comprising:
a covering shelf having front protrusive hinges and rear protrusion hinges on left and right sides of each of a front portion and a rear portion thereof; and
luggage side trims each having a front guide rail and a rear guide groove in which the front hinges and the rear hinges are respectively inserted,
wherein as the front hinges and the rear hinges are moved into the front guide rails and the rear guide groove, the covering shelf is converted into a using state in which the covering shelf is positioned over a luggage compartment to cover the luggage compartment, a standing state in which the covering shelf is open at an angle, and a stowed state in which the covering shelf is inserted behind a rear seat, and
wherein a plurality of supports that extend in a front-rear direction, protrude in a left-right direction, and are disposed under the rear guide groove are formed on the luggage side trims, and when the covering shelf is in the using state positioned over the luggage compartment to cover the luggage compartment, a bottom of the covering shelf is supported by the supports.

2. The apparatus of claim 1, wherein a fixing projection protrudes upward from each of the supports and projection grooves in which the fixing projections are inserted are formed on the covering shelf to restrict movement of the covering shelf in the using state.

3. The apparatus of claim 1, wherein the rear guide grooves are positioned over rear portions of the supports and are open upward, and each have an inclined surface that extends downward from the open top and a vertical surface that connects the inclined surface and the open top to each other, wherein the inclined surface is positioned ahead of the vertical surface.

4. The apparatus of claim 1, wherein the front guide rails extend longitudinally at an angle with lower ends positioned forward further than upper ends, and the upper ends are open upward.

5. The apparatus of claim 4, wherein the front guide rails each include:
an upper slot open upward;
a lower slot formed at a predetermined distance from the upper slot and extending downward in a longitudinal direction of the upper slot at the same angle;
a transverse slot that extends rearward from a lower end of the upper slot; and
a connecting slot that extends forward from a rear end of the transverse slot and is connected to the lower slot.

6. The apparatus of claim 5, wherein a fixing slot is connected to the lower end of each of the upper slots, and the rear hinges of the covering shelf are inserted into the fixing slots.

7. The apparatus of claim 6, wherein the front hinges of the covering shelf have a cross-sectional diameter unable to be inserted into the fixing slots and the cross-sectional diameter is greater than that of the rear hinges and the rear hinges of the covering shelf have a cross-sectional diameter capable of being inserted into the fixing slots and the cross-sectional diameter is smaller than the cross-sectional diameter of the front hinges.

8. The apparatus of claim 5, wherein when the front hinges are positioned at the lower ends of the upper slots and the rear hinges are inserted in the rear guide grooves, the covering shelf is positioned over the luggage compartment with the bottom supported by the supports, to maintain using state in which the covering shelf closes the luggage compartment.

9. The apparatus of claim 5, wherein locking projections extending up and down at the same angle as the lower slots and positioned at sides of the lower slots are formed on the luggage side trims and when the bottom of the covering shelf is in contact with both of front ends of the supports and upper ends of the locking projections, the covering shelf is maintained in the standing state in which the covering shelf is open at an angle.

10. The apparatus of claim 6, wherein when the front hinges are positioned at lower ends of the lower slots and the rear hinges are inserted in the fixing slots, the covering shelf is maintained in the stowed state in which the covering shelf is inserted behind the rear seat with the same angle as the front guide rails.

* * * * *